(12) United States Patent
Sawada et al.

(10) Patent No.: US 8,212,767 B2
(45) Date of Patent: Jul. 3, 2012

(54) INPUT DEVICE

(75) Inventors: Masaki Sawada, Osaka (JP); Tamotsu Yamamoto, Hyogo (JP); Hiroto Inoue, Kyoto (JP)

(73) Assignee: Panasonic Corporation, Osaka (JP)

( * ) Notice: Subject to any disclaimer, the term of this patent is extended or adjusted under 35 U.S.C. 154(b) by 718 days.

(21) Appl. No.: 11/733,533

(22) Filed: Apr. 10, 2007

(65) Prior Publication Data

US 2007/0254551 A1    Nov. 1, 2007

(30) Foreign Application Priority Data

Apr. 27, 2006 (JP) ................. 2006-123215

(51) Int. Cl.
  *G09G 5/00* (2006.01)
  *H01C 10/06* (2006.01)
  *G08C 19/12* (2006.01)
  *H01H 19/00* (2006.01)
(52) U.S. Cl. ............ 345/156; 338/92; 341/184; 200/6 A
(58) Field of Classification Search .......... 345/156–184; 200/4, 5 A, 5 R, 6 A, 18, 179
See application file for complete search history.

(56) References Cited

U.S. PATENT DOCUMENTS

| | | | | |
|---|---|---|---|---|
| 3,005,055 A | * | 10/1961 | Mattke | 341/184 |
| 4,297,542 A | * | 10/1981 | Shumway | 200/6 A |
| 4,554,618 A | * | 11/1985 | Bafunno et al. | 362/489 |
| 6,069,552 A | * | 5/2000 | Van Zeeland | 338/92 |
| 6,369,692 B1 | | 4/2002 | Van Zeeland | |
| 7,185,549 B2 | | 3/2007 | Mieda et al. | |
| 2003/0151103 A1 | | 8/2003 | Endo et al. | |
| 2004/0222968 A1 | | 11/2004 | Endo et al. | |

FOREIGN PATENT DOCUMENTS

| | | |
|---|---|---|
| GB | 221077 A | 9/1924 |
| JP | 11-232027 | 8/1999 |
| JP | 2003-242849 A | 8/2003 |
| JP | 2004-192520 A | 7/2004 |
| JP | 2006-019784 A | 1/2006 |
| WO | 01/86677 A1 | 11/2001 |

OTHER PUBLICATIONS

European Search Report Dated Jan. 7, 2008.
European Office Action, Dated Jan. 7, 2008.

* cited by examiner

*Primary Examiner* — Alexander S Beck
*Assistant Examiner* — Charles V Hicks
(74) *Attorney, Agent, or Firm* — Pearne & Gordon LLP (57) ABSTRACT

An input device has a circular arc resistive layer and a metal plate as a conductive layer that is faced to the circular arc resistive layer, and can detect a position operated by partial contact between them. The input device has an element unit where a linear insulating layer as a contact preventing unit for preventing both ends of the circular arc resistive layer from simultaneously coming into contact with the metal plate during operation is disposed on one end of the circular arc resistive layer.

3 Claims, 7 Drawing Sheets

INPUT DEVICE

BACKGROUND OF THE INVENTION

1. Field of the Invention

The present invention relates to an input device constituting an operation unit of various electronic apparatuses.

2. Background Art

Recently, various electronic apparatuses have been miniaturized and lightened in weight. The number of electronic apparatuses operated by selecting a predetermined function by moving a cursor displayed on a screen have been increased. A conventional input device corresponding to the operation form of the various electronic apparatuses is described hereinafter with reference to the drawings.

Figure 9:
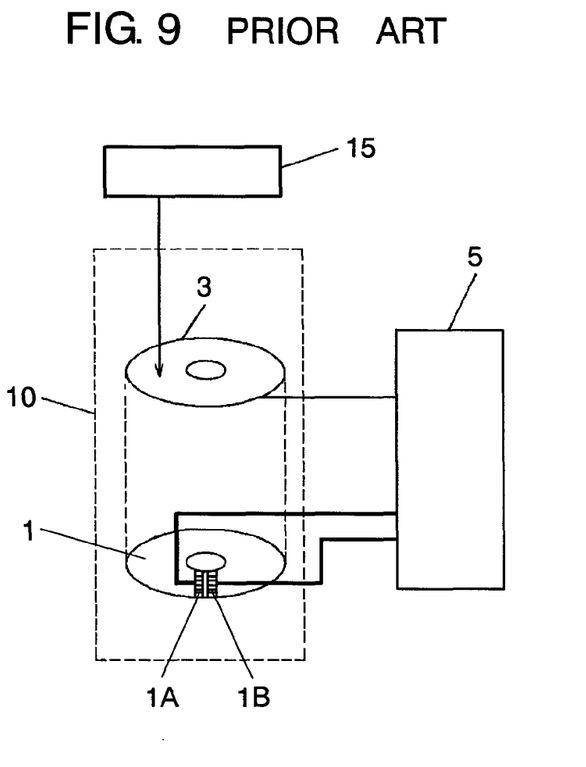
FIG. 9 is a conceptual diagram of a conventional input device.

FIG. 9 is a conceptual diagram of a conventional input device. In FIG. 9, element unit 10 of the conventional input device includes circular arc resistive layer 1 and a circular-ring-like conductive layer 3 facing circular arc resistive layer 1 at a predetermined distance. Each of ends 1A and 1B of circular arc resistive layer 1 and conductive layer 3 are coupled to control unit 5. Circular arc resistive layer 1, conductive layer 3, and drawn parts from them are formed on resin films that are faced to each other, but are not shown.

Figure 10:
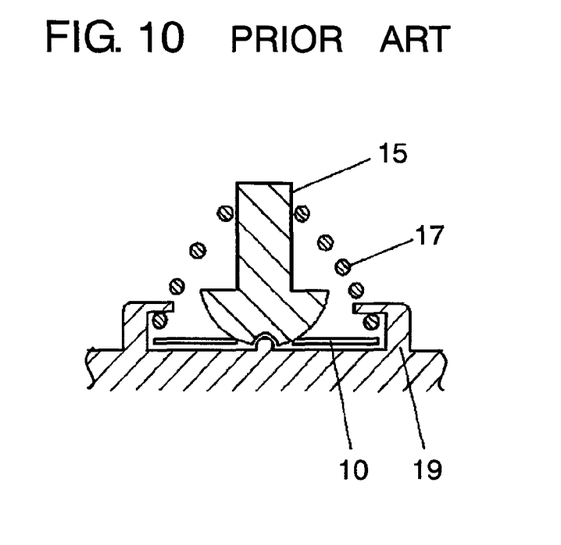
FIG. 10 is a sectional view of the conventional input device.
Figure 11:
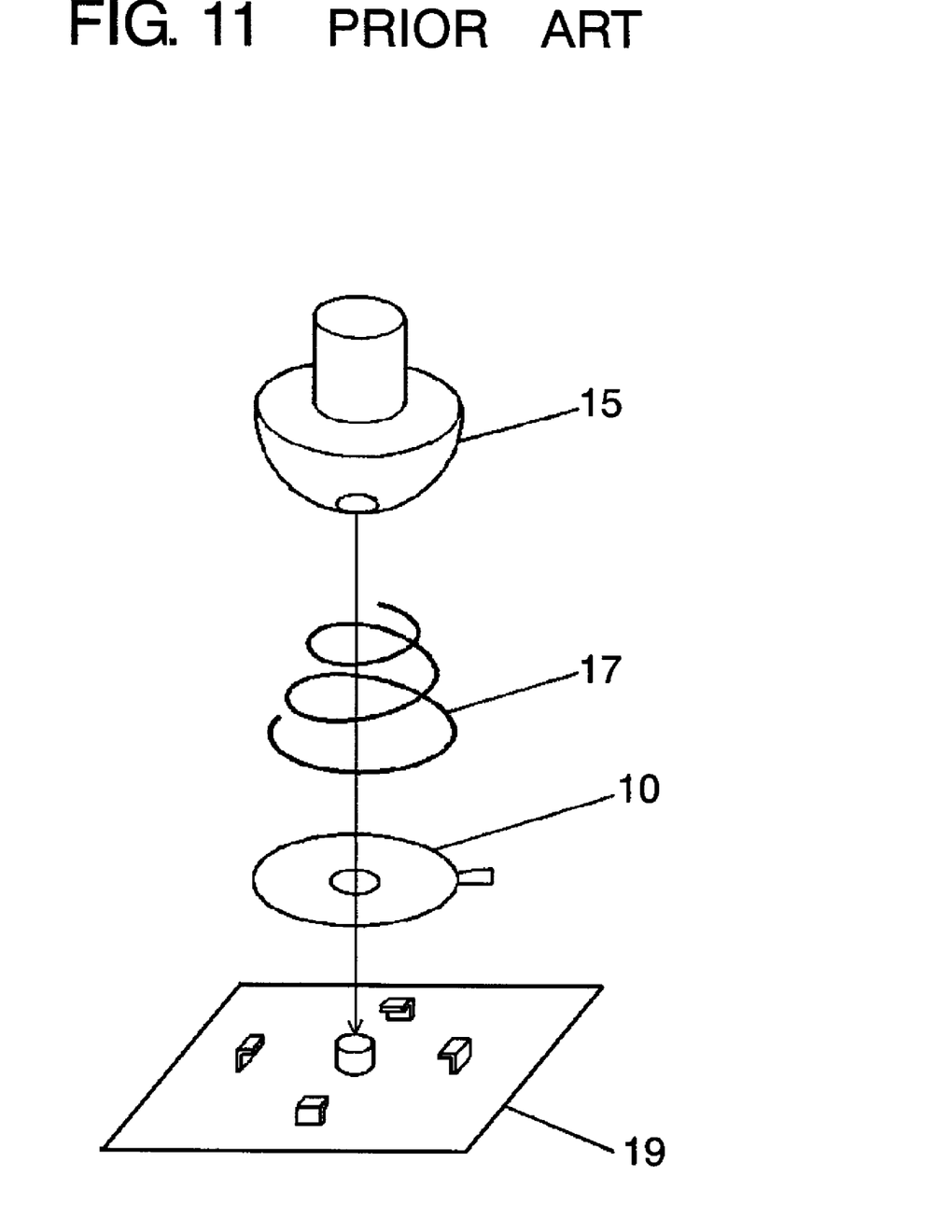
FIG. 11 is an exploded perspective view of the conventional input device.

As shown in a sectional view of FIG. 10 and an exploded perspective view of FIG. 11, operation body 15 having a spherical lower end used as an operation surface is disposed tiltably on element unit 10. Coil spring 17 is disposed in case 19 in order to support operation body 15 at a neutral position when operation body 15 is not operated.

Next, an operation of the conventional input device having the above-mentioned structure is described hereinafter. The conventional input device is operated by tilting operation body 15. In other words, the upper film is partially deflected with a pressing force from its outside using operation body 15, thereby providing a state where circular arc resistive layer 1 and conductive layer 3 partially come into contact with each other correspondingly to the deflected part. A predetermined voltage is placed between ends 1A and 1B of circular arc resistive layer 1 under control of control unit 5. The electric potential at the contact position is therefore input into control unit 5 through the drawn part from conductive layer 3. Control unit 5 specifies the operation position in response to a partial voltage ratio based on the input, and moves a cursor in response to the information.

Conventional art information related to the present invention is disclosed by Japanese Patent Unexamined Publication No. H11-232027, for example.

The structure of the conventional input device including its control method and its detection method of an operation position can be simplified, and especially element unit 10 can be thinned advantageously. However, the conventional input device has the following problem: when operation body 15 is tilted in an angle direction between ends 1A and 1B of circular arc resistive layer 1, ends 1A and 1B simultaneously come into contact with conductive layer 3 to provide a substantial short-circuit state. In this state, the quantity of flowing current increases to hasten the battery consumption, the output of the partial voltage ratio is the same as the output at the diagonal position to disable determination of the operation position, disadvantageously.

The conventional input device is used for only four-way operation or the like in an attached state to an apparatus. However, input devices have been demanded to have high resolution with recent enhancement in function of the apparatus.

SUMMARY OF THE INVENTION

The present invention addresses the conventional problems, and provides an input device that has a circular arc resistive layer, has no failure during operation at an angle position between the ends of the circular arc resistive layer, can detect an operation position, and has high resolution.

The input device of the present invention has a conductive layer faced to the circular arc resistive layer, and can detect a position operated by partial contact between the circular arc resistive layer and the conductive layer. The input device has a contact preventing unit for preventing both ends of the circular arc resistive layer from simultaneously coming into contact with the conductive layer during operation at the angle position between the ends of the circular arc resistive layer.

Therefore, an input device can be achieved inexpensively where the operation-position detection state and power consumption state during operation between both ends of the circular arc resistive layer or at an angle position near each of the ends are equivalent to those at other angle positions, the operation position can be detected over the full circumference, and the resolution is high.

DETAILED DESCRIPTION OF THE INVENTION

Input devices of exemplary embodiments of the present invention will be described with reference to the drawings.

First Exemplary Embodiment

Figure 1:
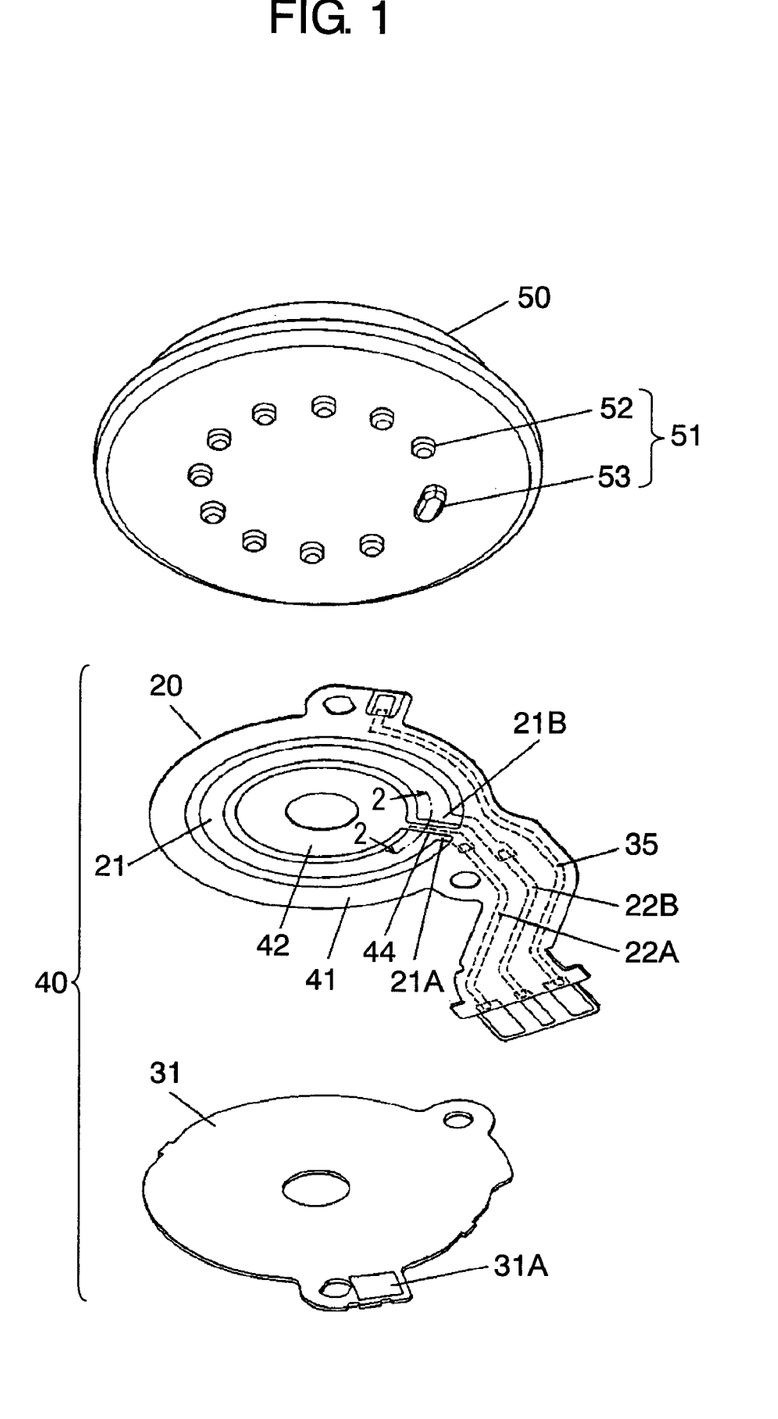
FIG. 1 is an exploded perspective view of an element unit of an input device in accordance with a first exemplary embodiment of the present invention.
Figure 2:
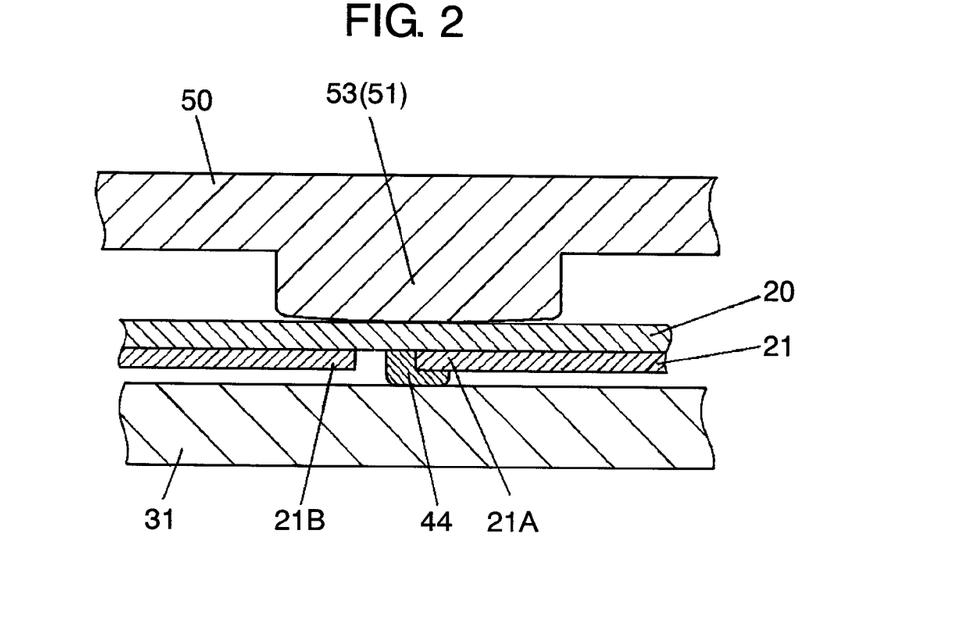
FIG. 2 is a partial sectional view of the element unit of the input device in accordance with the first exemplary embodiment.
Figure 3:
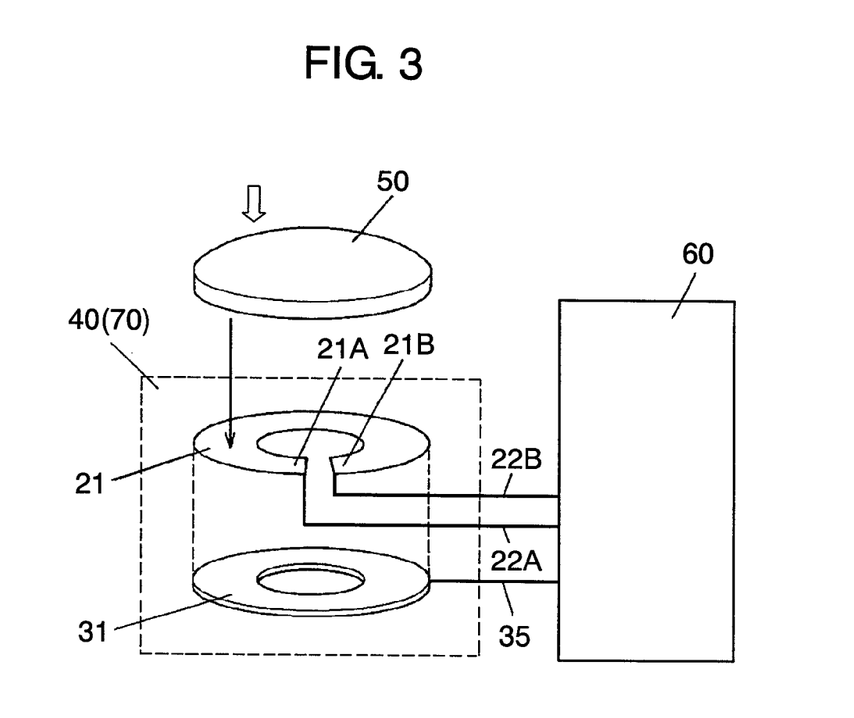
FIG. 3 is a conceptual diagram of the input device in accordance with the first exemplary embodiment.

FIG. 1 is an exploded perspective view of element unit 40 of an input device in accordance with exemplary embodiment 1 of the present invention. FIG. 2 is a partial sectional view of element unit 40 of the input device that is taken in the broken line pointed by arrows 2 of FIG. 1. FIG. 3 is a conceptual diagram of the input device in accordance with exemplary embodiment 1.

In FIG. 1, element unit 40 of the input device has substrate 20 and metal plate 31. Substrate 20 is a flexible resin film made of polyethylene terephthalate (PET) or the like, is formed in a shape having a tail part, and has circular arc resistive layer 21 printed on its lower face. Circular arc resistive layer 21 has a constant radial width. Ends 21A and 21B on both sides of circular arc resistive layer 21 are coupled to one-end sides of independent conductive first patterns 22A and 22B formed on the lower face of substrate 20, respectively. The-other-end sides of first patterns 22A and 22B are coupled to electrode parts drawn to the tip of the tail part. Conductive second pattern 35 used for metal plate 31 is formed on the lower face of substrate 20 corresponding to the outer periphery of circular arc resistive layer 21. The other end side of second pattern 35, similarly to first patterns 22A and 22B, is coupled to an electrode part drawn to the tip of the tail part. The tip of the tail part of substrate 20, including electrode parts, can be coupled to a corresponding connector.

Outer peripheral insulating layer 41 is made of insulating resin, and is formed so as to surround the outer periphery of circular arc resistive layer 21 at a predetermined distance. Outer peripheral insulating layer 41 covers first patterns 22A and 22B and second pattern 35 except for the electrode parts at the tip of the tail part and the electrode part coupled to one-end side of second pattern 35.

Inner peripheral insulating layer 42 is made of insulating resin similarly to outer peripheral insulating layer 41, and is formed inside circular arc resistive layer 21 at a predetermined distance.

Outer peripheral insulating layer 41 is coupled to inner peripheral insulating layer 42 through linear insulating layer 44 that has a narrow band shape and is formed in the radial direction. Linear insulating layer 44 is made of the same insulating resin as those of outer peripheral insulating layer 41 and inner peripheral insulating layer 42. Outer peripheral insulating layer 41, inner peripheral insulating layer 42, and linear insulating layer 44 are formed on the lower face of substrate 20 by pattern printing. Of these insulating layers, preferably, at least outer peripheral insulating layer 41 and inner peripheral insulating layer 42 are simultaneously formed so as to have the same height.

Linear insulating layer 44 is formed in the radial direction of circular arc resistive layer 21, and has a part laying on substrate 20 and a part lying on end 21A on one side of circular arc resistive layer 21. End 21A on one side of circular arc resistive layer 21 is referred to one end 21A, and end 21B on the other side is referred to the other end 21B.

In this structure, the part of linear insulating layer 44 formed so as to cover one end 21A works as a contact preventing unit. Here, one end 21A defines the opening in the circumferential direction of circular arc resistive layer 21.

Metal plate 31 formed in a substantially circular shape similarly to the circular part having circular arc resistive layer 21 of substrate 20 is disposed under substrate 20 having circular arc resistive layer 21 or the like. Substrate 20 is stuck and held on metal plate 31 at positions of outer peripheral insulating layer 41 and inner peripheral insulating layer 42 via an adhesive (not shown). In other words, substrate 20 is arranged so that circular arc resistive layer 21 points downward and faces metal plate 31 working as a conductive layer.

In the held state, as shown in FIG. 2, the surface of the part of linear insulating layer 44 formed on one end 21A of circular arc resistive layer 21 is in contact with the surface of metal plate 31. The circular ring part formed of circular arc resistive layer 21 and the opening between both ends of circular arc resistive layer 21 thereof vertically faces the upper face of metal plate 31 at a predetermined distance over substantially full circumference except the circumferential width of linear insulating layer 44 on one end 21A. Both circular arc resistive layer 21 and the part of linear insulating layer 44 may be vertically separated from metal plate 31 by a predetermined clearance.

While, the electrode part coupled to the one-end side of second pattern 35 exposed from outer peripheral insulating layer 41 is electrically coupled to coupling part 31A of metal plate 31 via a conductive adhesive or the like Element unit 40 of the input device is structured as discussed above, and a member for operation is disposed on element unit 40. An example of the member for operation includes operation body 50 that has a substantially disk shape swelling in the central part of the upside thereof, as shown in FIG. 1. Operation body 50 has, on its flat lower face, operation projections 51 for pressing, from the upside of substrate 20, the circular ring part formed of circular arc resistive layer 21 and the opening between the both ends of circular arc resistive layer 21 thereof. The shapes and arrangement states of operation body 50 and operation projection 51 are not especially limited. However, an input device including operation body 50 is hereinafter described as an example.

Operation projections 51 of operation body 50 are 10 cylindrical projections 52 independently arranged with 30° pitches and one circular arc projection 53 arranged at an angle position within the remaining 90°. The length of circular arc projection 53 is set so that each of the circumferential end positions thereof has an angle smaller than 30° with respect to cylindrical projection 52 adjacent to it.

The lower end of each cylindrical projection 52 has a flat small-diameter circular shape. The lower end of circular arc projection 53 has a circular arc shape that has the same width as the diameter of the small-diameter circular part and extends in the circumferential direction. The circular arc shape has both ends decreasing in height in the circumferential direction and has a large curvature radius. The bottoms of the small-diameter circular parts and the circular arc part define a predetermined curvature radius.

Operation body 50 disposed on substrate 20 is regulated by a case of an apparatus so that it does not rotate in a non-operation state, is held in a neutral state, and can be tilted downward by a pressing operation from its upside (not shown).

Operation body 50 is arranged so that circular arc projection 53 lies at a position over the opening between the both ends of circular arc resistive layer 21. The opening angle between the both ends of circular arc resistive layer 21 is smaller than the angle formed by circular arc projection 53. In the arrangement state of operation body 50, the both ends of circular arc projection 53 are positioned over circular arc resistive layer 21.

The input device of exemplary embodiment 1 has the above-mentioned structure. The input device is attached to a used apparatus by coupling first patterns 22A and 22B and second pattern 35 to control unit 60 of the apparatus by inserting the tail unit of substrate 20 into a connector attached to a wiring board (not shown) of the apparatus. FIG. 3 is a conceptual diagram of the attached state.

An operation in the attached state is described hereinafter. Operation body 50 is pressed down from the outside to be tilted downward, substrate 20 is partially deflected downward by operation projection 51 corresponding to the operation position, the part of circular arc resistive layer 21 corresponding to the position is brought into contact with metal plate 31. While, a predetermined voltage is applied to circular arc resistive layer 21 via first patterns 22A and 22B under control of control unit 60. The electric potential at a time of the partial contact in the operation state is fed into control unit 60 via metal plate 31 and second pattern 35. The partial voltage ratio of the predetermined voltage applied to circular arc resistive layer 21 can be determined based on the fed electric potential. Therefore, control unit 60 specifies the operation angle position based on the partial voltage ratio. In other words, the input device of the present invention has metal plate 31 as the conductive layer faced to circular arc resistive layer 21, and can detect the position operated by the partial contact between circular arc resistive layer 21 and the conductive layer.

As discussed above, the input device of exemplary embodiment 1 has the following structure. Linear insulating layer 44 as the insulating layer used as a contact preventing unit is partially overlaid in the radial direction on one end 21A of circular arc resistive layer 21, and circular arc projection 53 is corresponded to the position over the opening between the both ends of circular arc resistive layer 21. In other words, the input device of the present invention has a contact preventing unit for preventing the both ends of circular arc resistive layer 21 from simultaneously coming into contact with metal plate 31 as the conductive layer when operation is performed within the angle between the both ends of circular arc resistive layer 21. Therefore, when operation body 50 is tilted in the angle direction between the both ends of circular arc resistive layer 21, the both ends of circular arc resistive layer 21 are prevented from simultaneously coming into contact with metal plate 31.

Figure 4:
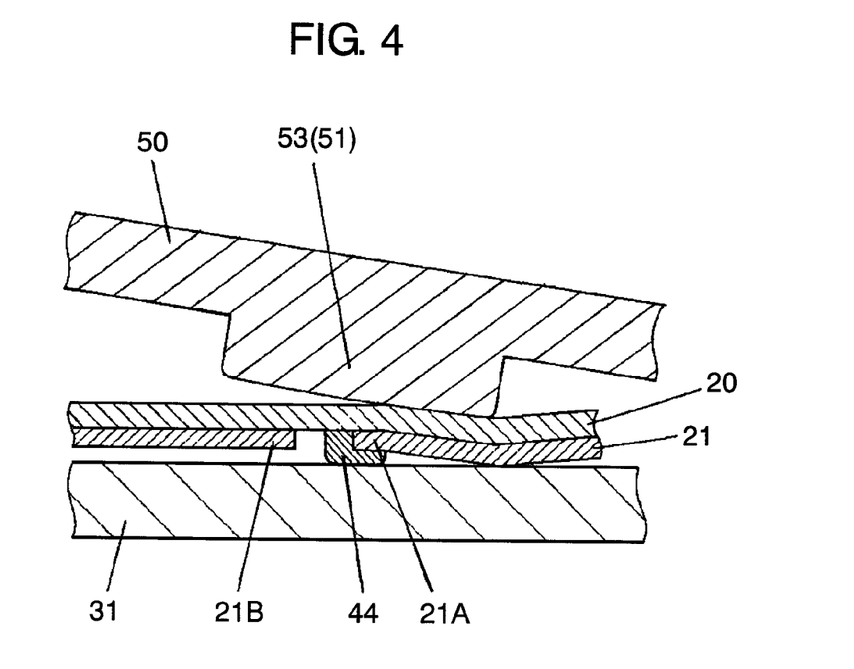
FIG. 4 is a partially enlarged sectional view showing an operation state of the input device in accordance with the first exemplary embodiment.
Figure 5:
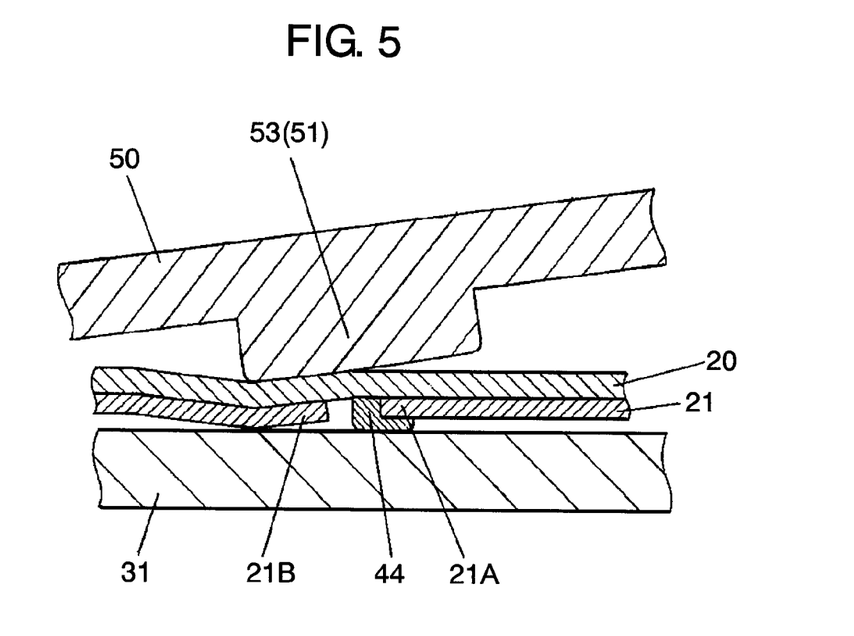
FIG. 5 is a partially enlarged sectional view showing another operation state of the input device in accordance with the first exemplary embodiment.

In other words, when operation body 50 is tilted in the angle direction between the both ends of circular arc resistive layer 21, substrate 20 is pressed and partially deflected by circular arc projection 53. This is similar to the cases at other angle positions. The part of linear insulating layer 44 overlaid on one end 21A of circular arc resistive layer 21 is the greatest in height from substrate 20. Therefore, operation body 50 is finely tilted to the circumferential side about the part of linear insulating layer 44 abutting on metal plate 31 from the abutting state. At this time, as shown in FIG. 4, linear insulating layer 44 and a part close to one end 21A of circular arc resistive layer 21 come into contact with metal plate 31, and the other end 21B is kept separate from it. Alternatively, as shown in FIG. 5, linear insulating layer 44 and a part close to the other end 21B come into contact with metal plate 31, and one end 21A is kept separate from it.

In either of these two cases, the electric potential at a time of the partial contact is fed into control unit 60 via metal plate 31 and second pattern 35. Therefore, the operation position can be sufficiently detected. Also when operation body 50 is tilted in the angle direction close to each end of circular arc resistive layer 21, a similar operation state is obtained. However, the detailed description is omitted.

In element unit 40 of the input device of embodiment 1, also when an operation is performed at an angle position between the both ends of circular arc resistive layer 21 or at an angle position close to each end, the both ends of circular arc resistive layer 21 are prevented from simultaneously coming into contact with metal plate 31. Therefore, the simultaneous contact does not cause a problem, the operation position can be detected similarly to the other angle positions, and power consumption can be set similarly to those at the other angle positions.

Regarding the other angle positions, cylindrical projection 52 corresponding to the operation position of operation body 50 partially presses down substrate 20. The part of circular arc resistive layer 21 at this position comes into contact with metal plate 31. Thus, control unit 60 specifies the operation position.

Therefore, a total of 12 positions, namely 10 positions corresponding to the arrangement angle positions of cylindrical projections 52 and two positions corresponding to circular arc projection 53, can be detected, and angle positions can be detected with substantially constant angle pitches.

Element unit 40 having linear insulating layer 44 as a contact preventing unit added to circular arc resistive layer 21 allows detection of operation positions in a high resolution over the full circumference of the circular ring part. Here, the circular ring part is formed of circular arc resistive layer 21 and the opening between its both ends. The resolution is set dependently on the arrangement state of the operation projections of operation body 50, so that a desired resolution is obtained by appropriately setting the shape of operation body 50. The arrangement restricting condition of element unit 40 is significantly relaxed when it is attached to an apparatus, differently from the conventional art. Therefore, the degree of freedom in design of the apparatus is also increased. Element unit 40 has a structure to which only linear insulating layer 44 is added, so that element unit 40 can be manufactured easily and inexpensively.

Linear insulating layer 44 is preferably formed on one end 21A of circular arc resistive layer 21 so as to extend over the full width of circular arc resistive layer 21 in the radial direction. However, linear insulating layer 44 may be partially formed when the both ends of circular arc resistive layer 21 do not simultaneously become conductive.

The shape of operation body 50 may be set appropriately as discussed above. For example, the number of operation projections 51 and setting of arrangement positions thereof may be changed, operation projections with a continuous circular ring shape may be used, or the lower faces of them may be spherical as the conventional art.

Element unit 40 of the input device of embodiment 1 has linear insulating layer 44 overlaid on circular arc resistive layer 21; however, an insulating layer as a contact preventing unit may be disposed on a facing position, which corresponds to one of the both ends of the circular arc resistive layer 21, of the conductive layer. This structure can also prevent the both ends of circular arc resistive layer 21 from simultaneously coming into contact with metal plate 31 even when operation is performed at an angle position between the both ends of circular arc resistive layer 21 or an angle position close to each end.

Element unit 40 of this structure may be operated from the opposite side, namely, the conductive layer side may be arranged on the upside and operated from the upside by operation body 50

Second Exemplary Embodiment

Figure 6:
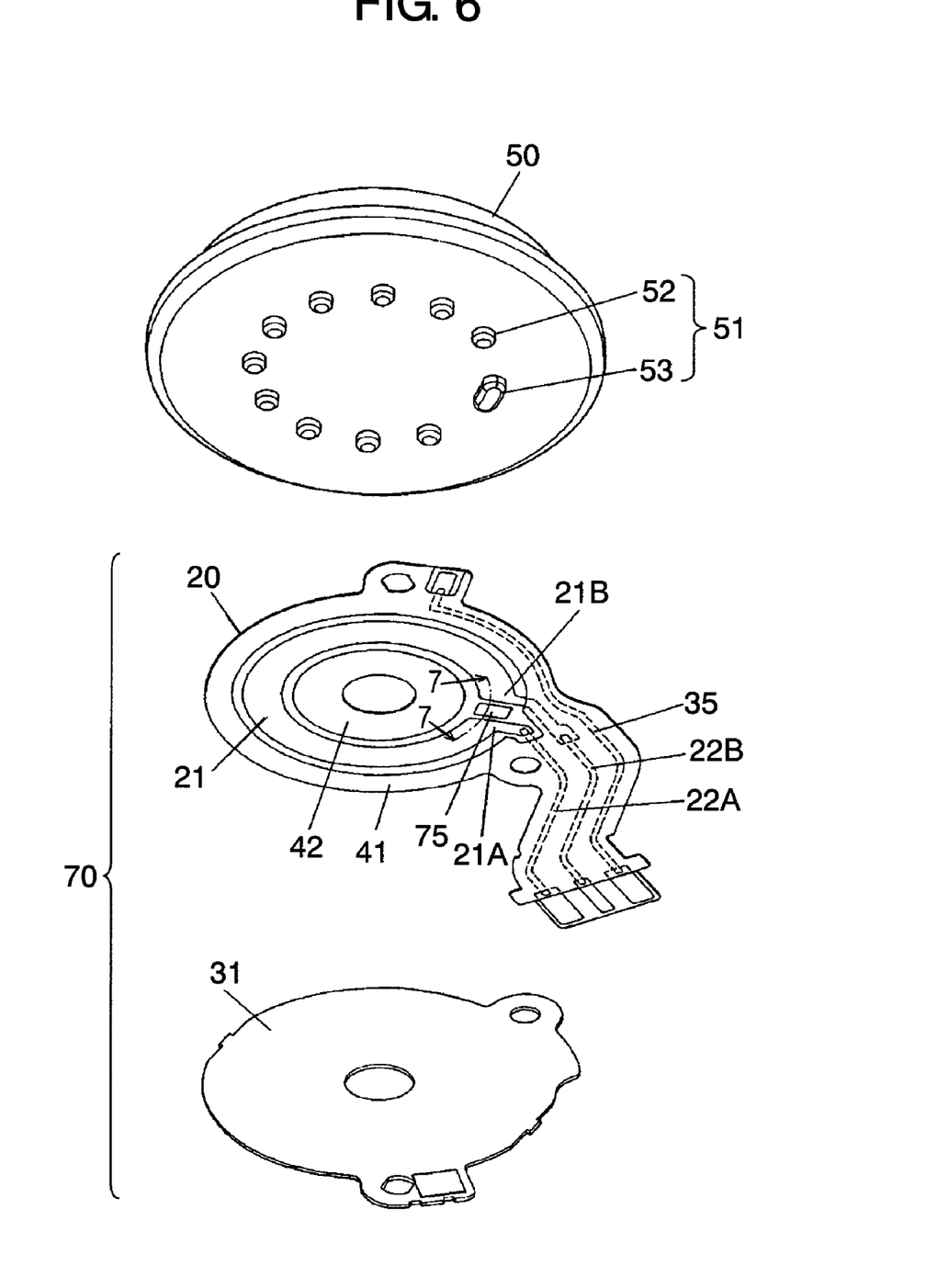
FIG. 6 is an exploded perspective view of an element unit of an input device in accordance with a second exemplary embodiment of the present invention.
Figure 7:
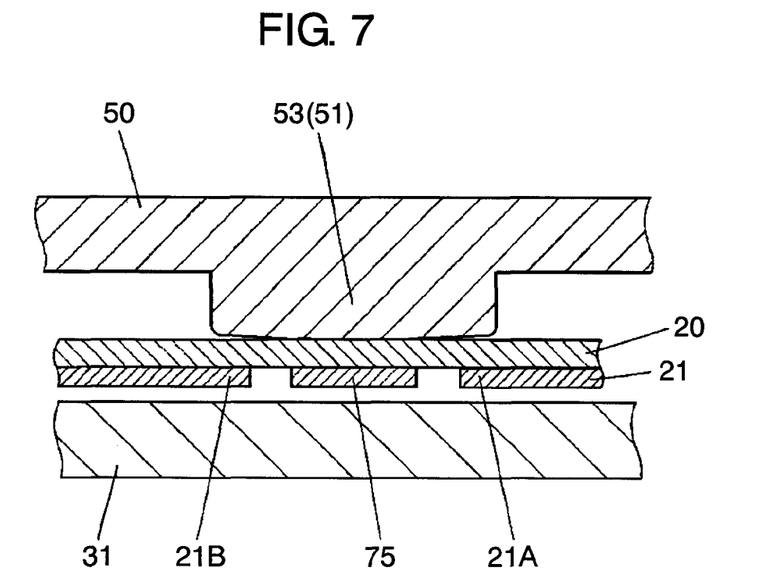
FIG. 7 is a partial sectional view of the element unit of the input device in accordance with the second exemplary embodiment.

FIG. 6 is an exploded perspective view of element unit 70 of an input device in accordance with exemplary embodiment 2 of the present invention. FIG. 7 is a partial sectional view of element unit 70 of the input device that is taken in the broken line pointed by arrows 7 of FIG. 6. Element unit 70 of the input device of exemplary embodiment 2 has an insulating film used as a contact preventing unit at a position different from that in exemplary embodiment 1. However, the other elements have much the same structure as that of exemplary embodiment 1, so that the same elements are denoted with the same reference marks and are not described in detailed.

Element unit 70 of the input device of embodiment 2 has the following structure shown in FIG. 6, similarly to element unit 40 of the input device of embodiment 1. Circular arc resistive layer 21 formed on the lower face of substrate 20 is vertically faced to metal plate 31 as a conductive layer at a predetermined distance. First patterns 22A and 22B, second pattern 35, and the like are formed on the lower face of substrate 20, and substrate 20 is stuck and held on metal plate 31 at positions of outer peripheral insulating layer 41 and inner peripheral insulating layer 42 on the outer and inner peripheries of circular arc resistive layer 21, similarly to embodiment 1.

However, element unit 70 of the input device of embodiment 2 has no linear insulating layer 44. As a contact preventing unit, island-like insulating layer 75 made of the insulating film is formed independently between both ends of circular arc resistive layer 21 on the lower face of substrate 20. Island-like insulating layer 75 corresponds to the island unit. Island-like insulating layer 75 has much the same width as that of circular arc resistive layer 21, and is formed in the circular ring part and at an intermediate position circumferentially at the same distance from the both ends of circular arc resistive layer 21. Here, the circular ring part is formed of circular arc resistive layer 21 and the opening between the both ends thereof. As shown in FIG. 7, the circular ring part, including the formed place of island-like insulating layer 75, is vertically faced to metal plate 31 over the full circumference at a predetermined distance.

Operation body 50 having operation projections 51 is arranged on substrate 20 disposed at an upward position so that the opening between the both ends of circular arc resistive layer 21 positionally corresponds to circular arc projection 53, similarly to embodiment 1.

The input device of embodiment 2 has the above-mentioned structure, and is attached to a used apparatus similarly to embodiment 1 of FIG. 3.

The operation of the input device is similar to that of embodiment 1 in the following points. While a predetermined voltage is applied to circular arc resistive layer 21 via first patterns 22A and 22B, operation body 50 is tilted to partially deflect substrate 20 with corresponding operation projection 51 (cylindrical projection 52 or circular arc projection 53), thereby partially bringing circular arc resistive layer 21 into contact with metal plate 31. When voltage obtained via second pattern 35 at this time is fed into control unit 60 and is calculated by control unit 60, a total of 12 operation positions can be detected.

However, as discussed above, the input device of embodiment 2 differs from that of embodiment 1 in the arrangement state of the contact preventing unit and the operation state at a position between the both ends of circular arc resistive layer 21 during operation. The operation state is described hereinafter in detail. Operation state at the other angle position is the same as that in embodiment 1.

In the input device of embodiment 2, when operation body 50 is tilted in an angle direction between the both ends of circular arc resistive layer 21, substrate 20 pressed by circular arc projection 53 is partially deflected at its pressed position to bring the corresponding part into contact with metal plate 31.

Figure 8:
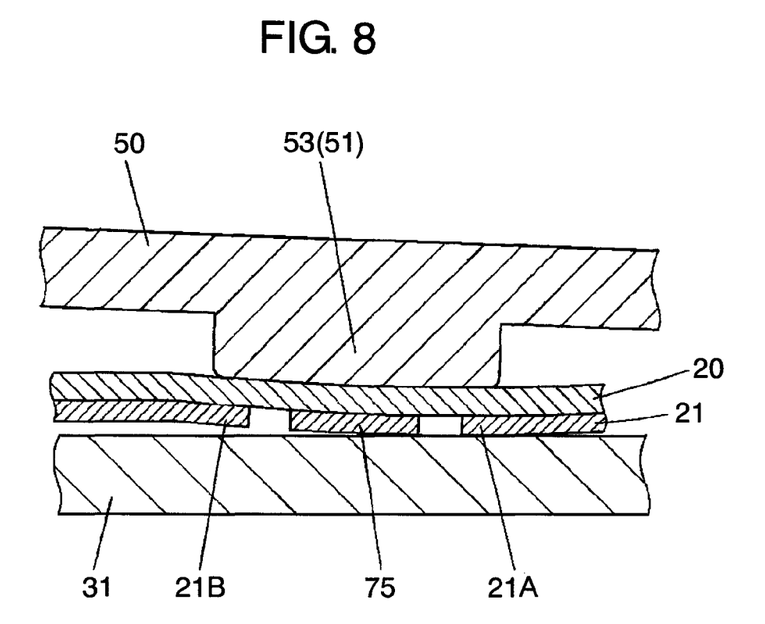
FIG. 8 is a partially enlarged sectional view showing an operation state of the input device in accordance with the second exemplary embodiment.

At this time, as shown in FIG. 8, the both ends of circular arc resistive layer 21 do not simultaneously come into contact with metal plate 31 because island-like insulating layer 75 as a contact preventing unit is independently disposed between the both ends of circular arc resistive layer 21. In other words, in the input device of the present invention, the contact preventing unit is formed of an island unit made of an insulating film formed between the both ends of circular arc resistive layer 21. During operation at an angle position between the both ends of circular arc resistive layer 21, metal plate 31 as a conductive layer comes into contact with one end 21A as one end side of circular arc resistive layer 21 and island-like insulating layer 75 as the island unit. The other end 21B as the other end side of circular arc resistive layer 21 is kept separate from metal plate 31. Alternatively, island-like insulating layer 75 and the other end 21B of circular arc resistive layer 21 come into contact with metal plate 31, and one end 21A is kept separate from it (not shown).

In the input device of embodiment 2, also, the both ends of circular arc resistive layer 21 do not simultaneously come into contact with metal plate 31 at angle positions between the both ends of circular arc resistive layer 21. The detection state at the operation position or the like can be made similar to that at the other angle position. Also when operation body 50 is tilted in the angle direction close to the end, a similar operation state is obtained. However, detail description of this state is omitted similarly to embodiment 1.

It is important to form island-like insulating layer 75 in consideration of an operation force applied from operation body 50 during operation and elasticity of substrate 20. For example, the thickness thereof is preferably equal to or slightly thicker than that of circular arc resistive layer 21. Element unit 70 of the input device of embodiment 2 has independent island-like insulating layer 75 arranged in parallel with circular arc resistive layer 21, so that element unit 70 can be thinned comparing with embodiment 1.

Element unit 70 of the input device of embodiment 2 may be a combination of principles of embodiment 1. In other words, one end side of island-like insulating layer 75 may be overlaid on one end 21A of circular arc resistive layer 21.

The input device of embodiment 2 has island-like insulating layer 75 formed of an insulating film; however, the input device may have an island unit formed of a conduct film independent from both ends of circular arc resistive layer 21, and a similar advantage can be expected also in this case. In this case, it is reasonable to form the conduct film as the island unit using the same material as that of circular arc resistive layer 21.

In the input device of embodiment 2, also, the shape of operation body 50 is not limited similarly to embodiment 1. The vertical arrangement relation between the conductive layer and the resistive layer may be opposite, similarly to the input device of embodiment 1.

A structure having a circular arc resistive layer and a contact preventing unit for preventing both ends of circular arc resistive layer 21 from simultaneously coming into contact with a conductive layer is within the scope of the present invention, even when the structure differs from the structures of embodiment 1 and embodiment 2. A circular arc resistive layer can be composed by elliptic arc shape, for example. The present invention can inexpensively achieve a thin input device that has high resolution comparing with the conventional art and can detect an operation position over substantially full circumference of the circular or elliptic ring part that is formed of the resistive layer and the opening between its both ends.

What is claimed is:
1. An input device comprising:
a circular arc resistive layer having an opening in a circumferential direction of the circular arc resistive layer and two ends defining the opening in the circumferential direction, wherein the two ends have opposing surfaces facing to each other across the opening; and
a conductive layer faced to the circular arc resistive layer with a gap formed between the conductive layer and the circular arc resistive layer,
wherein the input device can detect a position operated by partial contact between the circular arc resistive layer and the conductive layer, and wherein the input device further comprises a contact preventing unit, the contact preventing unit preventing both ends of the circular arc resistive layer from simultaneously coming into contact with the conductive layer when operation is performed at an angle position between the both ends of the circular arc resistive layer, wherein the contact preventing unit is formed of an insulating layer including a first portion overlaid on at least one end of the circular arc resistive layer and a second portion inserted into the opening always in contact with both at least one of the opposing surfaces of the circular arc resistive layer and the conductive layer.

2. The input device of claim 1, wherein the contact preventing unit is L-shaped in a sectional view, and wherein one leg of the L-shaped contact preventing unit is the first portion, and another leg of the L-shaped contact preventing unit is the second portion that covers a side face of at least one end of the circular arc resistive layer.

3. The input device of claim 1, wherein the second portion is separated from another end of the circular arc resistive layer.

* * * * *